US010232850B2

(12) United States Patent
Obayashi et al.

(10) Patent No.: US 10,232,850 B2
(45) Date of Patent: Mar. 19, 2019

(54) PARKING-LOT-LEAVING SUPPORT APPARATUS AND VEHICLE

(71) Applicants: TOYOTA JIDOSHA KABUSHIKI KAISHA, Toyota-shi, Aichi-ken (JP); DENSO CORPORATION, Kariya-shi, Aichi-ken (JP); AISIN SEIKI KABUSHIKI KAISHA, Kariya-shi, Aichi-ken (JP)

(72) Inventors: Motonari Obayashi, Nagakute (JP); Hironobu Ishijima, Toyota (JP); Masaki Kinoshita, Kariya (JP); Yutaka Hamamoto, Kariya (JP); Masaya Kato, Toyokawa (JP); Yusuke Kiyokawa, Toyota (JP)

(73) Assignees: TOYOTA JIDOSHA KABUSHIKI KAISHA, Toyota (JP); DENSO CORPORATION, Kariya (JP); AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/151,833

(22) Filed: May 11, 2016

(65) Prior Publication Data

US 2016/0339911 A1    Nov. 24, 2016

(30) Foreign Application Priority Data

May 19, 2015    (JP) ................. 2015-102205

(51) Int. Cl.
*B60W 30/095*    (2012.01)
*B62D 15/02*    (2006.01)

(52) U.S. Cl.
CPC ....... *B60W 30/0956* (2013.01); *B62D 15/027* (2013.01); *B62D 15/028* (2013.01); *B60W 2550/10* (2013.01)

(58) Field of Classification Search
CPC ...... B60W 30/095; B60R 1/025; B62D 7/159; B62D 15/025; B62D 15/0285; G08G 1/168; G01C 21/3685
(Continued)

(56) References Cited

U.S. PATENT DOCUMENTS

| 6,615,944 B1 * | 9/2003 | Horwath ............... B62D 7/159 180/204 |
| 2004/0257684 A1 * | 12/2004 | Meyer ................... B60R 1/025 359/862 |
| 2005/0285756 A1 * | 12/2005 | Shwak ............. G08G 1/096716 340/903 |

(Continued)

FOREIGN PATENT DOCUMENTS

| CN | 104139780 A | 11/2014 |
| EP | 2801510 A1 | 11/2014 |

(Continued)

OTHER PUBLICATIONS

Oct. 12, 2016 European Search Report issued in European Patent Application No. 16169530.9.

*Primary Examiner* — Abby Y Lin
*Assistant Examiner* — Sanjeev Malhotra
(74) *Attorney, Agent, or Firm* — Oliff PLC

(57) ABSTRACT

A parking-lot-leaving support apparatus, to execute parking-lot-leaving support to support a vehicle leaving a parking lot, based on a positional relationship between the vehicle and an obstacle in a back-and-forth direction of the vehicle, includes a determination unit configured to determine whether an obstacle exists in a side direction of the vehicle, based on a detection result of a detection unit that detects an obstacle in the side direction of the vehicle; and an inhibition unit configured to, when the determination unit has determined that the obstacle exists in the side direction of the vehicle, inhibit the parking-lot-leaving support in a direction that coincides with the side direction.

5 Claims, 12 Drawing Sheets

(58) Field of Classification Search
USPC .......... 701/29.1, 31.4, 532, 1; 180/204; 359/862; 340/903, 932.2; 386/223; 348/148; 198/341.01
See application file for complete search history.

(56) References Cited

U.S. PATENT DOCUMENTS

| | | | | |
|---|---|---|---|---|
| 2009/0005961 A1* | 1/2009 | Grabowski | .......... | G01C 21/365 701/532 |
| 2012/0170902 A1* | 7/2012 | Zhu | .......... | H04N 5/76 386/223 |
| 2012/0262580 A1* | 10/2012 | Huebner | .......... | B60R 1/00 348/148 |
| 2013/0073119 A1* | 3/2013 | Huger | .......... | B62D 15/027 701/1 |
| 2014/0202829 A1* | 7/2014 | Eberhardt | .......... | G01N 35/04 198/341.01 |
| 2014/0336841 A1* | 11/2014 | Shin | .......... | B62D 15/028 701/1 |
| 2015/0206360 A1* | 7/2015 | Schnurr | .......... | B60W 50/0097 701/29.1 |
| 2015/0279210 A1* | 10/2015 | Zafiroglu | .......... | G08G 1/065 340/932.2 |
| 2016/0033297 A1* | 2/2016 | Konishi | .......... | G01C 21/3685 701/31.4 |
| 2017/0088130 A1* | 3/2017 | Suzuki | .......... | B60R 11/04 |

FOREIGN PATENT DOCUMENTS

| | | |
|---|---|---|
| JP | 2009-40319 A | 2/2009 |
| JP | 2009-190531 A | 8/2009 |
| JP | 2014-121984 A | 7/2014 |

* cited by examiner

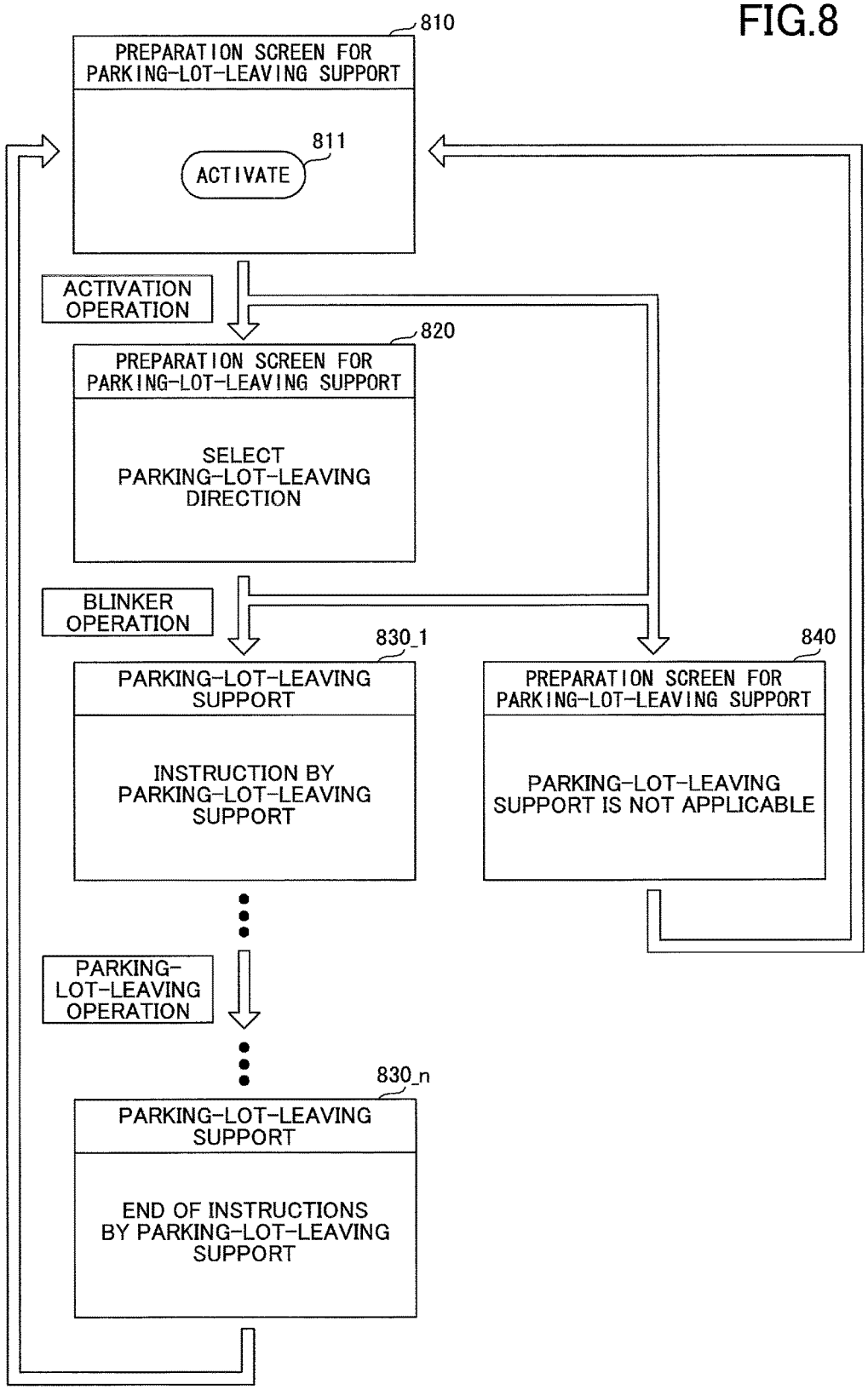

PARKING-LOT-LEAVING SUPPORT APPARATUS AND VEHICLE

FIELD

The following disclosure generally relates to a parking-lot-leaving support apparatus that supports a vehicle that leaves a parking lot, and a vehicle having the parking-lot-leaving support apparatus installed.

BACKGROUND

Conventionally, parking-lot-leaving support has been known that supports a vehicle that leaves a parking lot, based on a positional relationship with an obstacle in the back-and-forth direction.

Such parking-lot-leaving support calculates the distance to the obstacle in the back-and-forth direction, and derives a parking-lot-leaving path to have the vehicle leave the parking lot without contacting the obstacle (see, for example, Japanese Laid-open Patent Publication No. 2009-190531).

However, such conventional parking-lot-leaving support does not monitor the side direction (left and right direction) of the vehicle when deriving a parking-lot-leaving path. Therefore, even in a circumstance where there is an obstacle in the side direction, and the vehicle may contact the obstacle, the parking-lot-leaving support may be executed, and an occupant (for example, the driver) may feel a sense of discomfort.

Thereupon, it is an object of an embodiment to reduce such a sense of discomfort of an occupant, which may be felt when executing parking-lot-leaving support that supports a vehicle that leaves a parking lot just based on a positional relationship with an obstacle in the back-and-forth direction, by executing the support depending on a circumstance around the vehicle.

SUMMARY

According to the disclosure, a parking-lot-leaving support apparatus, to execute a parking-lot-leaving support to support a vehicle leaving a parking lot, based on a positional relationship between the vehicle and an obstacle in a back-and-forth direction of the vehicle, includes a determination unit configured to determine whether an obstacle exists in a side direction of the vehicle, based on a detection result of a detection unit that detects an obstacle in the side direction of the vehicle; and an inhibition unit configured to, when the determination unit has determined that the obstacle exists in the side direction of the vehicle, inhibit the parking-lot-leaving support in a direction that coincides with the side direction in which the obstacle exists.

According to an embodiment, it is possible to reduce a sense of discomfort of an occupant, which may be felt when executing parking-lot-leaving support that supports a vehicle that leaves a parking lot just based on a positional relationship with an obstacle in the back-and-forth direction, by executing the support depending on a circumstance around the vehicle.

BRIEF DESCRIPTION OF DRAWINGS

FIG. 8 is a diagram that illustrates transition of screens of a parking-lot-leaving support system;

DESCRIPTION OF EMBODIMENTS

In the following, embodiments will be described with reference to the drawings. Note that throughout the specification and the drawings, elements that have substantially the same functions and configurations are assigned the same codes, and duplicated description will be omitted.

[First Embodiment]

<1. Overall configuration of parking-lot-leaving support system>

Figure 1:
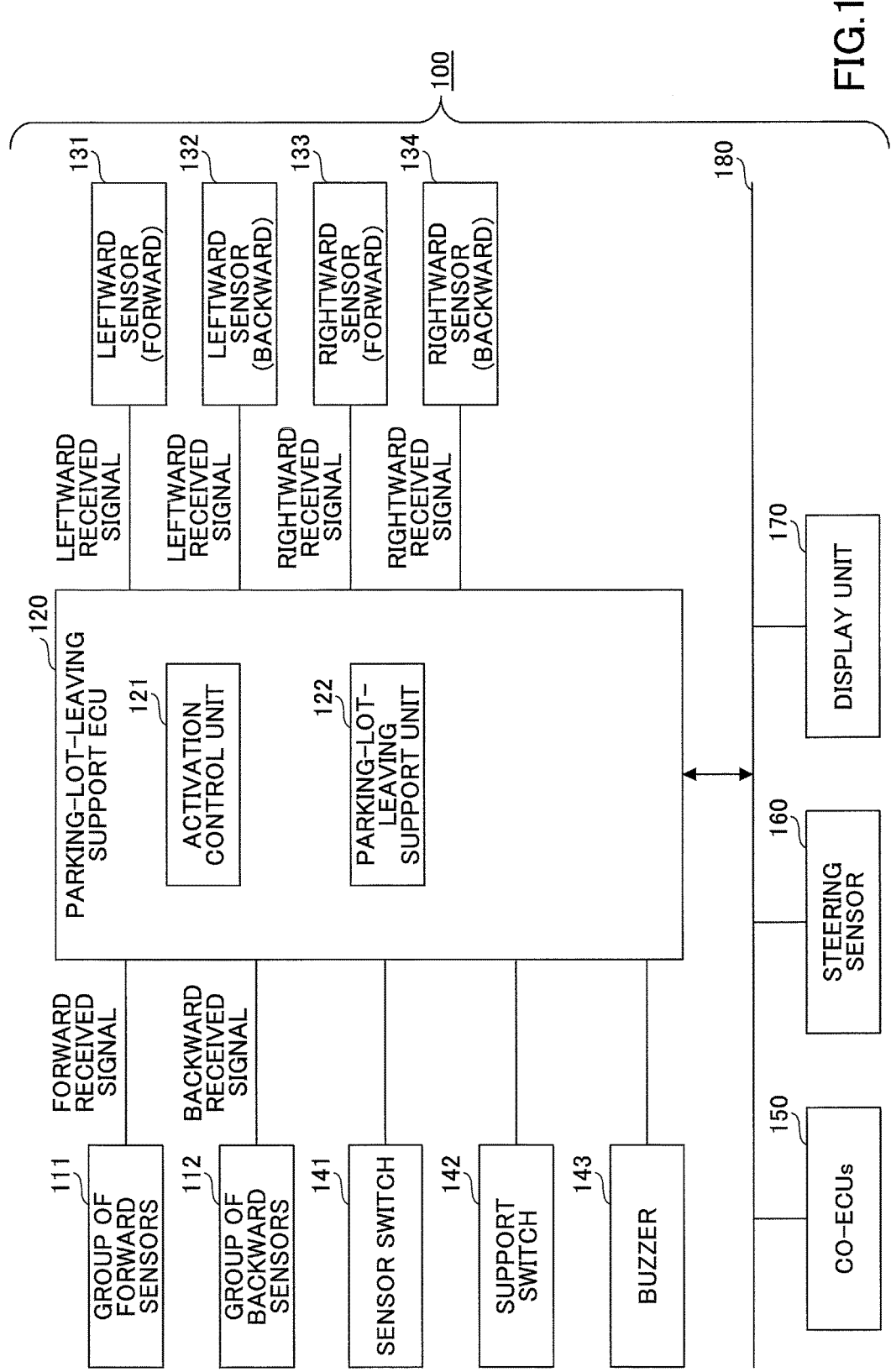
FIG. 1 is a diagram that illustrates an example of an overall configuration of a parking-lot-leaving support system for parallel parking.

First, an overall configuration of a parking-lot-leaving support system that includes a parking-lot-leaving support ECU (Electronic Control Unit), which is an example of a parking-lot-leaving support apparatus, will be described according to a first embodiment. FIG. 1 is a diagram that illustrates an example of the overall configuration of the parking-lot-leaving support system for parallel parking 100.

As illustrated in FIG. 1, the parking-lot-leaving support system for parallel parking 100 includes a group of forward sensors 111, a group of backward sensors 112, a parking-lot-leaving support ECU 120, a leftward sensor (forward) 131, a leftward sensor (backward) 132, a rightward sensor (forward) 133, and a rightward sensor (backward) 134. The parking-lot-leaving support system 100 also includes a sensor switch 141, a support switch 142, and a buzzer 143. The parking-lot-leaving support system 100 further includes a co-ECU 150, a steering sensor 160, and a display unit 170. Note that the parking-lot-leaving support ECU 120, the co-ECU 150, the steering sensor 160, and the display unit 170 are mutually connected via an in-vehicle network 180 based on communication standards such as CAN (Controller Area Network) and the like.

The group of forward sensors 111 includes multiple supersonic wave sensors (detection units) called "clearance sonars". Each of the supersonic wave sensors emits a supersonic wave in a forward direction of the vehicle, and receives a reflected wave from an obstacle ahead. The reflected waves received by the respective supersonic wave sensors included in the group of forward sensors 111 are transmitted to the parking-lot-leaving support ECU 120 as forward received signals.

Similar to the group of forward sensors 111, the group of backward sensors 112 includes multiple supersonic wave sensors. Each of the supersonic wave sensors emits a supersonic wave in a backward direction of the vehicle, and receives a reflected wave from an obstacle behind. The reflected waves received by the respective supersonic wave sensors included in the group of backward sensors 112 are transmitted to the parking-lot-leaving support ECU 120 as backward received signals.

The leftward sensor (forward) 131 and the leftward sensor (backward) 132 are supersonic wave sensors (detection units) that are disposed at a front position and at a rear position, respectively, on the left side of the vehicle; they emit supersonic waves in leftward directions of the vehicle, and receive reflected waves from an obstacle on the left. The reflected waves received by the leftward sensor (forward) 131 and the leftward sensor (backward) 132 are transmitted to the parking-lot-leaving support ECU 120 as leftward received signals (detection results).

Similarly, the rightward sensor (forward) 133 and the rightward sensor (backward) 134 are supersonic wave sensors (detection units) that are disposed at a front position and at a rear position, respectively, on the right side of the vehicle; they emit supersonic waves in rightward directions of the vehicle, and receive reflected waves from an obstacle on the right. The reflected waves received by the rightward sensor (forward) 133 and the rightward sensor (backward) 134 are transmitted to the parking-lot-leaving support ECU 120 as rightward received signals (detection results).

The parking-lot-leaving support ECU 120 has an activation control program and a parking-lot-leaving support program installed, and by executing these programs, the parking-lot-leaving support ECU 120 functions as an activation control unit 121 and a parking-lot-leaving support unit 122.

The activation control unit 121 controls activation of the parking-lot-leaving support unit 122. The activation control unit 121 determines whether the vehicle is in a parallel parking state, based on the forward received signals and the backward received signals. Also, if determining that the vehicle is in a parallel parking state, and an occupant (for example, the driver) performs an activation operation of the parking-lot-leaving support unit 122, the activation control unit 121 determines whether to activate the parking-lot-leaving support unit 122, based on the leftward received signals and the rightward received signals. Note that if determining that the vehicle is in a parallel parking state, the activation control unit 121 transmits an activation command to the parking-lot-leaving support unit 122.

In response to the activation command from the activation control unit 121, the parking-lot-leaving support unit 122 activates itself, and calculates the distance to the obstacle in the back-and-forth direction of the vehicle, based on the forward received signals and the backward received signals. Also, based on the calculated distance, the parking-lot-leaving support unit 122 calculates a parking-lot-leaving path, and indicates parking-lot-leaving operations suitable for the calculated parking-lot-leaving path, to the driver via the display unit 170.

The sensor switch 141 is a switch to operate the supersonic wave sensors included in the group of forward sensors 111 and the group of backward sensors 112. The support switch 142 is a switch to operate the parking-lot-leaving support ECU 120. The buzzer 143 generates a sound if the parking-lot-leaving support unit 122 has been activated, and there is a likelihood that the vehicle contacts an obstacle ahead or behind.

The co-ECU 150 may include various ECUs that relate to the parking-lot-leaving support by the parking-lot-leaving support unit 122. Specifically, an EPS (Electronic Power Steering)-ECU and a VSC (Vehicle Stability Control)/ECB (Electronically Controlled Brake System)-ECU) may be included. Also, ECUs for EFI (Electric Fuel Injection)/ECT (Electronic Controlled Transmission)/HV (Hybrid Vehicle) may be included. Note that, for example, blinker information is transmitted from the co-ECU 150 to the activation control unit 121 of the parking-lot-leaving support ECU 120 in the embodiment.

The steering sensor 160 detects a steering angle of the steering of the vehicle. The display unit 170 displays various screens under control of the activation control unit 121 and the parking-lot-leaving support unit 122. In the embodiment, the display unit 170 displays, for example, a preparation screen for the parking-lot-leaving support transmitted by the activation control unit 121, and a screen for the parking-lot-leaving support transmitted from the parking-lot-leaving support unit 122.

Note that the example system in FIG. 1 is configured to have the group of forward sensors 111, the group of backward sensors 112, the leftward sensor (forward) 131, the leftward sensor (backward) 132, the rightward sensor (forward) 133, and the rightward sensor (backward) 134 connected with the parking-lot-leaving support ECU 120. However, another example system may be configured to have these sensors connected with another device or the like so that the parking-lot-leaving support ECU 120 receives the received signals from these sensors via the in-vehicle network 180.

Also, the system in FIG. 1 is configured to have the parking-lot-leaving support ECU 120 provided separately from the co-ECU 150. However, functions implemented by the parking-lot-leaving support ECU 120 may be implemented, for example, on the co-ECU 150 so as to be integrated with the co-ECU 150.

<2. Hardware configuration of parking-lot-leaving support ECU>

Figure 2:
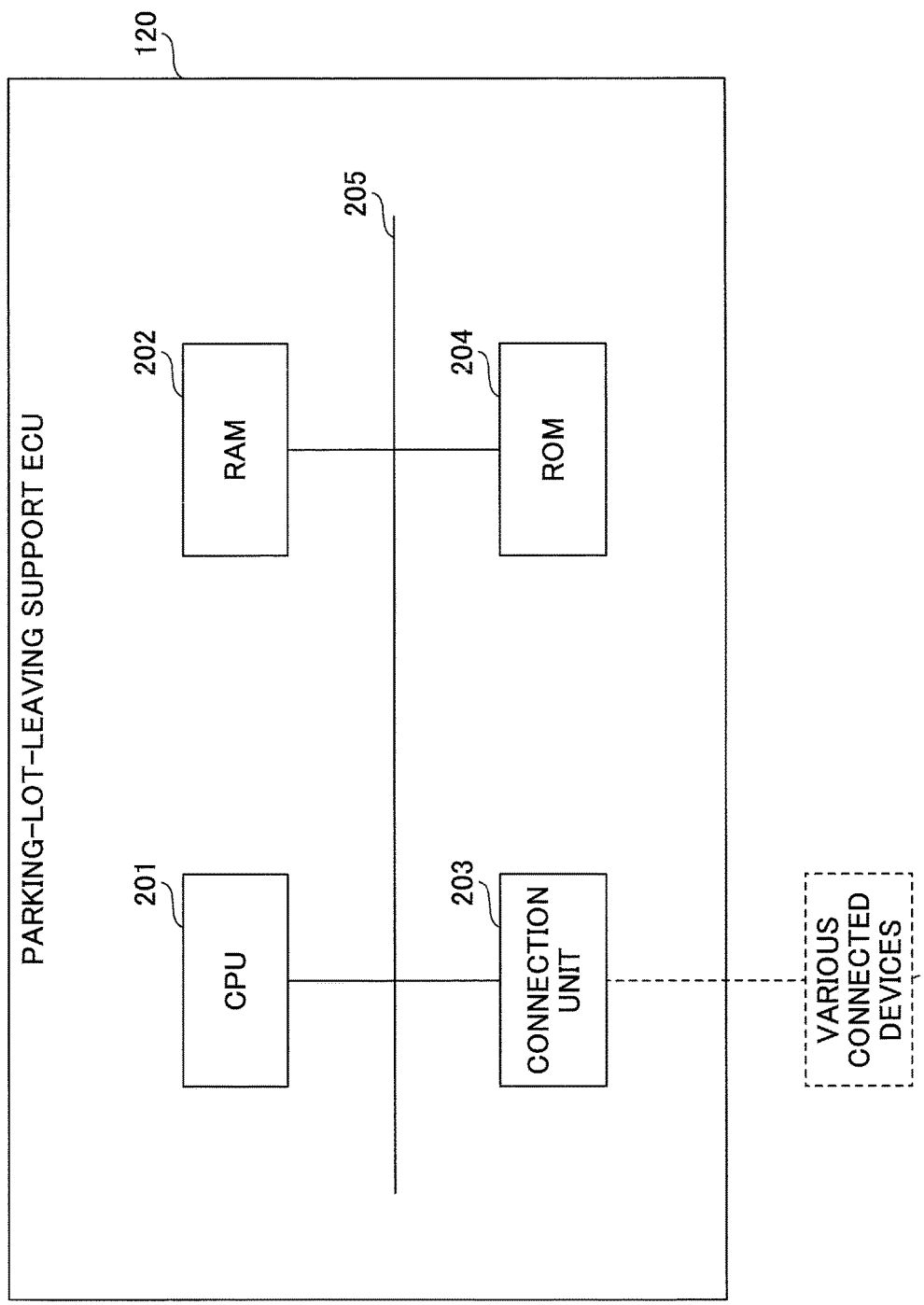
FIG. 2 is a diagram that illustrates an example of a hardware configuration of a parking-lot-leaving support ECU.

Next, a hardware configuration of the parking-lot-leaving support ECU 120 will be described. FIG. 2 is a diagram that illustrates an example of a hardware configuration of the parking-lot-leaving support ECU 120.

As illustrated in FIG. 2, the parking-lot-leaving support ECU 120 includes a CPU (Central Processing Unit) 201, a RAM (Random Access Memory) 202, a connection unit 203, and a ROM (Read-Only Memory) 204. Note that these units of the parking-lot-leaving support ECU 120 are mutually connected via a bus 205.

The CPU 201 is a computer that executes various programs (an activation control program, a parking-lot-leaving support program, and the like) stored in the ROM 204.

The RAM 202 is a main memory unit such as a DRAM (Dynamic Random Access Memory) and a SRAM (Static Random Access Memory). The RAM 202 functions as a work area in which the programs stored in the ROM 204 are loaded and executed by the CPU 201. The RAM 202 also functions as a storage area in which information is temporarily stored that is generated or obtained by the programs stored in the ROM 204, and executed by the CPU 201.

The connection unit 203 is connected with various devices such as the group of forward sensors 111, the group of backward sensors 112, and the leftward sensor (forward)

131 through the rightward sensor (backward) 134, and serves as an interface to receive information from the various devices. Also, the connection unit 203 is connected with the in-vehicle network 180, and transmits and receives various information items via the in-vehicle network 180.

The ROM 204 is a main memory unit such as an EPROM and an EEPROM, to store the programs executed by the CPU 201, and information that is used when the programs are executed.

<3. Arrangement of sensors and detection ranges>

Figure 3:
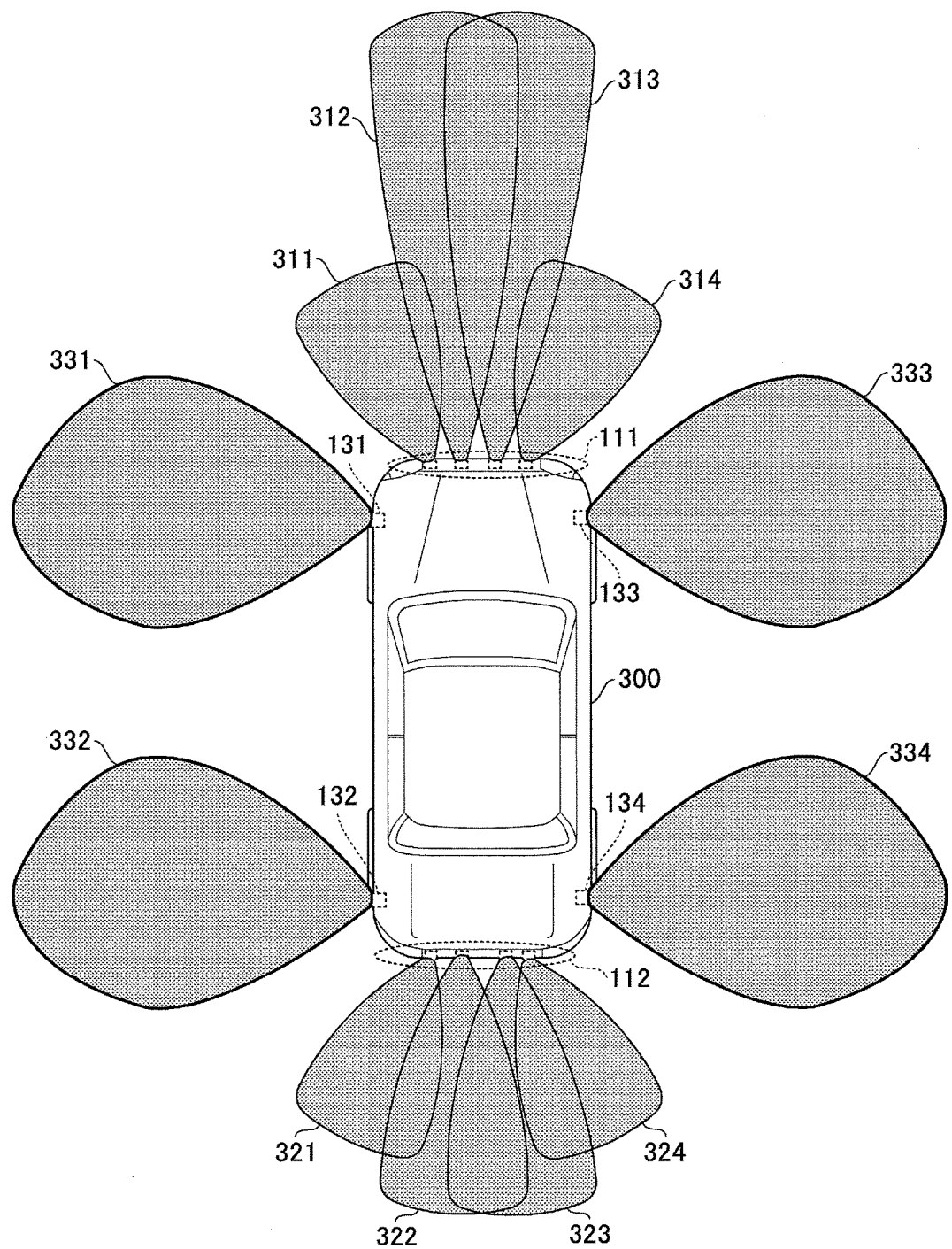
FIG. 3 is a diagram that illustrates an arrangement of sensors on a vehicle and their detection ranges.

Next, an arrangement of the sensors connected with the parking-lot-leaving support ECU 120, and detection ranges in which the sensors can detect an obstacle will be described. FIG. 3 is a diagram that illustrates an arrangement of sensors on a vehicle and their detection ranges.

As illustrated in FIG. 3, the group of forward sensors 111 includes four supersonic wave sensors in the embodiment. The four supersonic wave sensors of the group of forward sensors 111 are installed, for example, on the front bumper of a vehicle 300, and emit supersonic waves in forward directions of the vehicle 300. The detection range of an obstacle by the group of forward sensors 111 is designated by areas 311 to 314.

Similarly, the group of backward sensors 112 includes four supersonic wave sensors in the embodiment. The four supersonic wave sensors of the group of backward sensors 112 are installed, for example, on the rear bumper of the vehicle 300, and emit supersonic waves in backward directions of the vehicle 300. The detection range of an obstacle by the group of backward sensors 112 is designated by areas 321 to 324.

The leftward sensor (forward) 131 is disposed at a front position on the left side of the vehicle 300, and emits a supersonic wave in a leftward direction. The detection range of an obstacle by the leftward sensor (forward) 131 is designated by an area 331.

The leftward sensor (backward) 132 is disposed at a rear position on the left side of the vehicle 300, and emits a supersonic wave in a leftward direction. The detection range of an obstacle by the leftward sensor (backward) 132 is designated by an area 332.

Similarly, the detection ranges of an obstacle by the rightward sensor (forward) 133 and the rightward sensor (backward) 134 are designated by areas 333 and 334, respectively.

<4. Functional configuration of parking-lot-leaving support ECU>

Next, a functional configuration of the parking-lot-leaving support ECU 120 will be described. Note that among functional units implemented by the parking-lot-leaving support ECU 120, the parking-lot-leaving support unit 122, which is implemented based on information received or transmitted with the co-ECU 150 and the steering sensor 160, has substantially the same functions as in a conventional parking-lot-leaving support unit. Therefore, description is omitted here for the parking-lot-leaving support unit 122, and the activation control unit 121 will be described.

Figure 4:
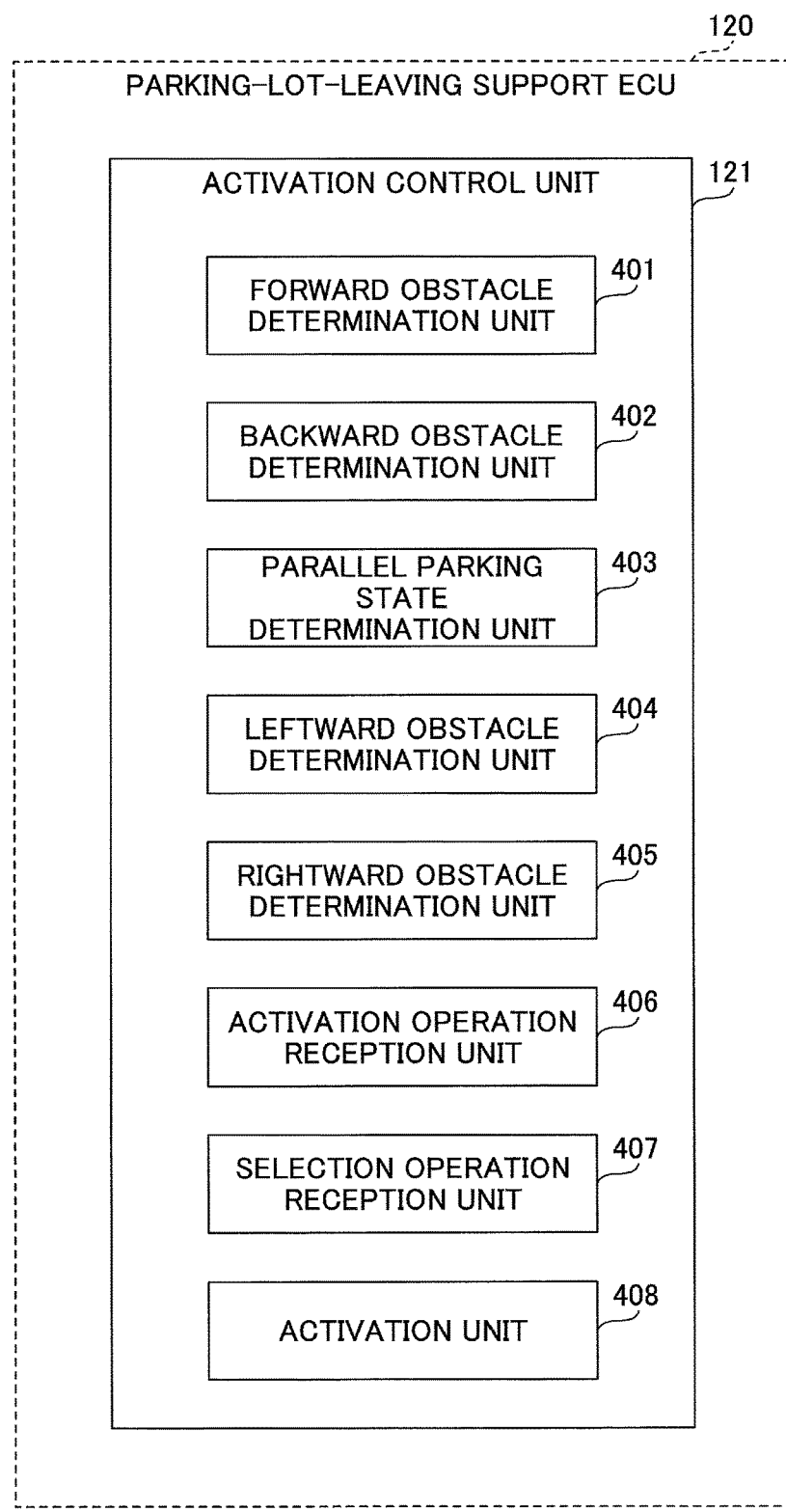
FIG. 4 is a diagram that illustrates an example of a functional configuration of an activation control unit of a parking-lot-leaving support ECU.

FIG. 4 is a diagram that illustrates an example of a functional configuration of the activation control unit 121 of the parking-lot-leaving support ECU 120. As illustrated in FIG. 4, the activation control unit 121 includes a forward obstacle determination unit 401, a backward obstacle determination unit 402, and a parallel parking state determination unit 403. The activation control unit 121 further includes a leftward obstacle determination unit 404, a rightward obstacle determination unit 405, an activation operation reception unit 406, a selection operation reception unit 407, and an activation unit 408.

The forward obstacle determination unit 401 determines whether there is an obstacle in front of the vehicle 300 (in the detection range designated by the areas 311 to 314), based on forward received signals transmitted by the group of forward sensors 111. If determining that there is an obstacle in front of the vehicle 300, the forward obstacle determination unit 401 calculates the distance to the obstacle. Note that the forward obstacle determination unit 401 indicates existence of an obstacle and the distance to the obstacle to the parallel parking state determination unit 403 at predetermined cycles.

The backward obstacle determination unit 402 determines whether there is an obstacle behind the vehicle 300 (in the detection range designated by the areas 321 to 324), based on backward received signals transmitted by the group of backward sensors 112. If determining that there is an obstacle behind the vehicle 300, the forward obstacle determination unit 401 calculates the distance to the obstacle. Note that the backward obstacle determination unit 402 indicates existence of an obstacle and the distance to the obstacle to the parallel parking state determination unit 403 at predetermined cycles.

Based on existence or non-existence of an obstacle(s) indicated by the forward obstacle determination unit 401 and the backward obstacle determination unit 402, the parallel parking state determination unit 403 determines whether the vehicle 300 is in a parallel parking state. If receiving indication of existence of an obstacle from the forward obstacle determination unit 401, the parallel parking state determination unit 403 determines that the vehicle 300 is in a parallel parking state, positioned behind another vehicle. If receiving indication of existence of an obstacle from the backward obstacle determination unit 402, the parallel parking state determination unit 403 determines that the vehicle 300 is in a parallel parking state, positioned in front of another vehicle.

If receiving indication of no obstacle from the forward obstacle determination unit 401 and the backward obstacle determination unit 402, the parallel parking state determination unit 403 determines that the vehicle 300 is not in a parallel parking state.

Then, the parallel parking state determination unit 403 indicates the determination result whether the vehicle 300 is in a parallel parking state to the activation operation reception unit 406. Note that if indicating a determination result that the vehicle 300 is in a parallel parking state, the parallel parking state determination unit 403 also indicates the distance to the obstacle (the other vehicle), to the activation operation reception unit 406.

The leftward obstacle determination unit 404 determines whether there is an obstacle on the left of the vehicle 300 (in the detection ranges designated by the areas 331 and 332), based on leftward received signals transmitted by the leftward sensor (forward) 131 and the leftward sensor (backward) 132. If determining that there is an obstacle on the left of the vehicle 300, the leftward obstacle determination unit 404 calculates the distance to the obstacle. Note that the leftward obstacle determination unit 404 indicates existence of an obstacle and the distance to the obstacle to the activation operation reception unit 406 at predetermined cycles.

The rightward obstacle determination unit 405 determines whether there is an obstacle on the right of the vehicle 300 (in the detection ranges designated by the areas 333 and 334), based on rightward received signals transmitted by the rightward sensor (forward) 133 and the rightward sensor (backward) 134. If determining that there is an obstacle on the right of the vehicle 300, the rightward obstacle determination unit 405 calculates the distance to the obstacle. Note that the rightward obstacle determination unit 405 indicates existence of an obstacle and the distance to the obstacle to the activation operation reception unit 406 at predetermined cycles.

The activation operation reception unit 406 displays a preparation screen for the parking-lot-leaving support on the display unit 170 to receive an activation operation of the parking-lot-leaving support unit 122, and if the driver of the vehicle 300 performs the activation operation of the parking-lot-leaving support unit 122, receives the activation operation. In response to receiving the activation operation by the driver, the activation operation reception unit 406 refers to the determination result indicated by the parallel parking state determination unit 403, to determine whether the vehicle 300 is in a parallel parking state now. If determining that the vehicle 300 is not in a parallel parking state, the activation operation reception unit 406 does not send an activation command to the activation unit 408, and displays a preparation screen for the parking-lot-leaving support on the display unit 170, including a message that the parking-lot-leaving support unit 122 is not applicable to the current state of the vehicle. In other words, the activation operation reception unit 406 functions as a first inhibition unit to inhibit execution of the parking-lot-leaving support unit 122, based on a parallel parking state.

Also, if determining that the vehicle 300 is in a parallel parking state, the activation operation reception unit 406 refers to the existence of an obstacle and the distance to the obstacle indicated by the leftward obstacle determination unit 404 and the rightward obstacle determination unit 405. Then, the activation operation reception unit 406 determines whether there is an obstacle within a predetermined distance on the left (for example, within two meters, or the width of a vehicle). The activation operation reception unit 406 also determines whether there is an obstacle within a predetermined distance on the right (for example, within two meters, or the width of a vehicle).

Note that the activation operation reception unit 406 uses the same determination method for determining whether there is an obstacle on the left, and on the right. For example, suppose that the activation operation reception unit 406 determines whether there is an obstacle on the left, with reference to a determination result and a calculation result based on a leftward received signal from the leftward sensor (forward) 131. In this case, the activation operation reception unit 406 determines whether there is an obstacle on the right, with reference to a determination result and a calculation result based on a rightward received signal from the rightward sensor (forward) 133. Also, suppose that the activation operation reception unit 406 determines whether there is an obstacle on the left, with reference to a determination result and a calculation result based on a leftward received signal from the leftward sensor (backward) 132. In this case, the activation operation reception unit 406 determines whether there is an obstacle on the right, with reference to a determination result and a calculation result based on a rightward received signal from the rightward sensor (backward) 134.

Also, suppose that the activation operation reception unit 406 is configured to determine that there is an obstacle on the left if one of leftward received signals from the leftward sensor (forward) 131 and the leftward sensor (backward) 132 represents existence of an obstacle. In this case, the activation operation reception unit 406 is also configured to determine that there is an obstacle on the right if one of rightward received signals from the rightward sensor (forward) 133 and the rightward sensor (backward) 134 represents existence of an obstacle.

Alternatively, suppose that the activation operation reception unit 406 is configured to determine that there is an obstacle on the left if both leftward received signals from the leftward sensor (forward) 131 and the leftward sensor (backward) 132 represent existence of an obstacle. In this case, the activation operation reception unit 406 is also configured to determine that there is an obstacle on the right if both rightward received signals from the rightward sensor (forward) 133 and the rightward sensor (backward) 134 represent existence of an obstacle.

If determining that there is an obstacle within the predetermined distance on the left of the vehicle 300, and there is an obstacle within the predetermined distance on the right of the vehicle 300, the activation operation reception unit 406 does not send an activation command to the activation unit 408. In other words, the activation operation reception unit 406 inhibits execution of the parking-lot-leaving support unit 122. In this case, the activation operation reception unit 406 displays a preparation screen for the parking-lot-leaving support on the display unit 170, including a message that the parking-lot-leaving support unit 122 is not applicable to the current state of the vehicle. In other words, the activation operation reception unit 406 also functions as a second inhibition unit to inhibit execution of the parking-lot-leaving support unit 122, due an obstacle in a side direction (leftward or rightward direction).

Also, if determining that there is no obstacle within the predetermined distance on the left of the vehicle 300, or there is no obstacle within the predetermined distance on the right of the vehicle 300, the activation operation reception unit 406 indicates the determination result to the selection operation reception unit 407. In this case, the activation operation reception unit 406 also indicates the distance to the obstacle ahead or behind to the selection operation reception unit 407.

In response to receiving the indication of the determination result from the activation operation reception unit 406, the selection operation reception unit 407 displays a preparation screen for the parking-lot-leaving support on the display unit 170, including a message that prompts the driver to perform a selection operation of a parking-lot-leaving direction, to receive a selection operation of a parking-lot-leaving direction from the driver of the vehicle 300.

After having displayed the preparation screen for the parking-lot-leaving support on the display unit 170 including the message that prompts the driver to perform a selection operation of a parking-lot-leaving direction, if receiving blinker information from the co-ECU 150, the selection operation reception unit 407 identifies the parking-lot-leaving direction selected by the driver, based on the blinker information.

If it has been determined that there is no obstacle within the predetermined distance on the left of the vehicle 300, and the identified parking-lot-leaving direction is leftward, the selection operation reception unit 407 sends an activation command of the parking-lot-leaving support unit 122 to the activation unit 408. At this moment, the selection operation reception unit 407 also indicates the distance to the obstacle ahead or behind to the activation unit 408.

Also, if it has been determined that there is no obstacle within the predetermined distance on the right, and the identified parking-lot-leaving direction is rightward, the selection operation reception unit 407 sends an activation command of the parking-lot-leaving support unit 122 to the activation unit 408. At this moment, the selection operation reception unit 407 also indicates the distance to the obstacle ahead or behind to the activation unit 408.

On the other hand, if it has been determined that there is an obstacle within the predetermined distance on the left of the vehicle 300, and the identified parking-lot-leaving direction is leftward, the selection operation reception unit 407 does not send an activation command of the parking-lot-leaving support unit 122 to the activation unit 408. Note that in this case, the selection operation reception unit 407 displays a preparation screen for the parking-lot-leaving support on the display unit 170, including a message that the parking-lot-leaving support unit 122 is not applicable to the current state of the vehicle.

Also, if it has been determined that there is an obstacle within the predetermined distance on the right of the vehicle 300, and the identified parking-lot-leaving direction is rightward, the selection operation reception unit 407 does not send an activation command of the parking-lot-leaving support unit 122 to the activation unit 408. Note that in this case, the selection operation reception unit 407 displays a preparation screen for the parking-lot-leaving support on the display unit 170, including a message that the parking-lot-leaving support unit 122 is not applicable to the current state of the vehicle. In other words, the selection operation reception unit 407 functions as a third inhibition unit to inhibit execution of the parking-lot-leaving support unit 122, based on a relative positional relationship between an obstacle in the left and right direction, and a parking-lot-leaving direction selected by the driver.

If receiving an activation command of the parking-lot-leaving support unit 122 from the selection operation reception unit 407, the activation unit 408 transmits the activation command to the parking-lot-leaving support unit 122. When transmitting the activation command, the activation unit 408 also transmits the distance to the obstacle ahead or behind indicated by the selection operation reception unit 407. This activates the parking-lot-leaving support unit 122, and a screen for the parking-lot-leaving support is displayed on the display unit 170 that includes a parking-lot-leaving operation based on the parking-lot-leaving path derived depending on the distance to the obstacle.

On the other hand, if not receiving an activation command of the parking-lot-leaving support unit 122 from the selection operation reception unit 407, the activation unit 408 does not transmit an activation command to the parking-lot-leaving support unit 122.

In this way, even if an activation operation of the parking-lot-leaving support unit 122 has been performed, the activation control unit 121 does not transmit an activation command to the parking-lot-leaving support unit 122 if determining that the vehicle is not in a parallel parking state, and hence, not in a state suitable for activating the parking-lot-leaving support unit 122. Also, the activation control unit 121 does not transmit an activation command to the parking-lot-leaving support unit 122 if determining that the vehicle is not in a state suitable for activating the parking-lot-leaving support unit 122, due to an obstacle on the left or right, and its relative positional relationship with the parking-lot-leaving direction. Consequently, the activation control unit 121 makes it possible to activate the parking-lot-leaving support function of the vehicle 300 in a parallel parking state, depending on a circumstance around the vehicle 300.

<5. Flow of process for activation control of parking-lot-leaving support by activation control unit>

Figure 5:
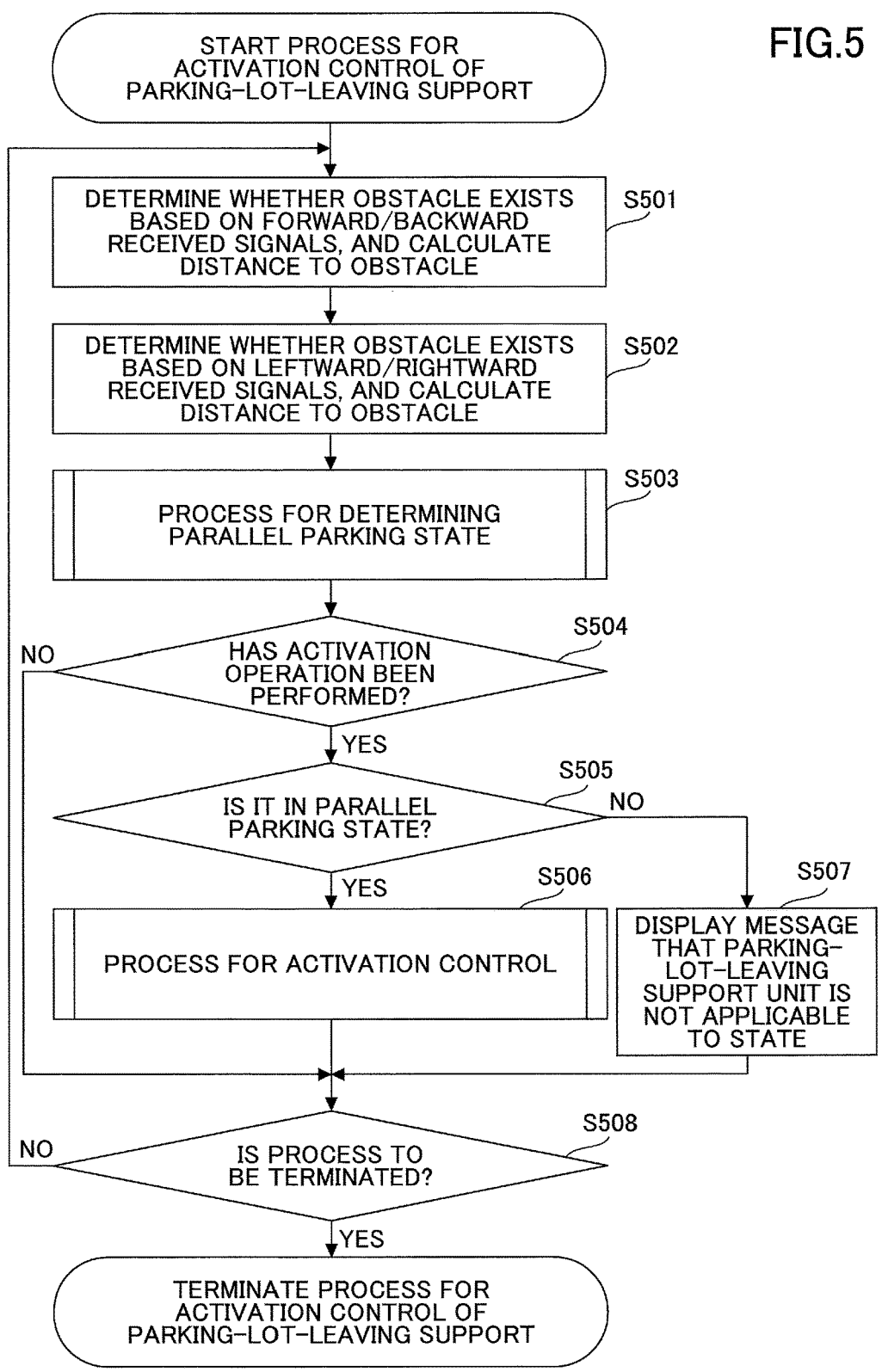
FIG. 5 is a flowchart that illustrates a flow of a process for activation control of parking-lot-leaving support by an activation control unit.

Next, a flow of a process for activation control of a parking-lot-leaving support by the activation control unit 121 will be described. FIG. 5 is a flowchart that illustrates the flow of the process for activation control of a parking-lot-leaving support by the activation control unit 121.

When the sensor switch 141 is operated, and the support switch 142 is further operated, then, the parking-lot-leaving support ECU 120 is activated, and the activation control unit 121 starts the process for activation control of a parking-lot-leaving support.

At Step S501, the forward obstacle determination unit 401 and the backward obstacle determination unit 402 determine existence or non-existence of an obstacle, and calculate the distance to the obstacle based on the forward received signals and the backward received signals transmitted by the group of forward sensors 111 and the group of backward sensors 112, respectively. Also, the forward obstacle determination unit 401 and the backward obstacle determination unit 402 indicate the existence or non-existence of an obstacle and the distance to the obstacle to the parallel parking state determination unit 403, respectively.

At Step S502, the leftward obstacle determination unit 404 and the rightward obstacle determination unit 405 determine existence or non-existence of an obstacle, and calculate the distance to the obstacle based on the leftward received signals and the rightward received signals transmitted by the leftward sensor (forward) 131 to the rightward sensor (backward) 134, respectively. Also, the leftward obstacle determination unit 404 and the rightward obstacle determination unit 405 indicate the existence or non-existence of an obstacle and the distance to the obstacle to the activation operation reception unit 406.

At Step S503, based on determination results indicated by the forward obstacle determination unit 401 and the backward obstacle determination unit 402, the parallel parking state determination unit 403 determines whether the vehicle 300 is in a parallel parking state. Note that a process for determining a parallel parking state by the parallel parking state determination unit 403 will be described in detail later.

At Step S504, the activation operation reception unit 406 determines whether the driver of the vehicle 300 has performed an activation operation to activate the parking-lot-leaving support unit 122. At Step S504, if determining that the driver has not performed an activation operation, the process goes forward to Step S507. On the other hand, at Step S504, if determining that the driver has performed an activation operation, the process goes forward to Step S505.

At Step S505, the activation operation reception unit 406 refers to the determination result of the process for determining a parallel parking state at Step S503, and if the determination result indicates that "it is not in a parallel parking state", goes forward to Step S507.

At Step S507, the activation operation reception unit 406 displays a preparation screen for the parking-lot-leaving support on the display unit 170 including a message that the parking-lot-leaving support unit 122 is not applicable to the current state of the vehicle.

On the other hand, at Step S505, if the determination result indicates that "it is in a parallel parking state", the process goes forward to Step S506. At Step S506, the activation operation reception unit 406, the selection operation reception unit 407, and the activation unit 408 execute a process for activation control. When executing the process for activation control, existence or non-existence of an obstacle and the distance to the obstacle transmitted by the leftward obstacle determination unit 404 and the rightward obstacle determination unit 405, and blinker information transmitted by the co-ECU 150, are used. Note that the process for activation control will be described in detail later.

At Step S508, the activation unit 408 determines whether to terminate the process for activation control of the parking-lot-leaving support. If determining not to terminate the process for activation control of the parking-lot-leaving support, the process goes back to Step S501. On the other hand, at Step S508, if determining to terminate the process for activation control of the parking-lot-leaving support, the process terminates.

<6. Flow of process for determining a parallel parking state by parallel parking state determination unit>

Figure 6:
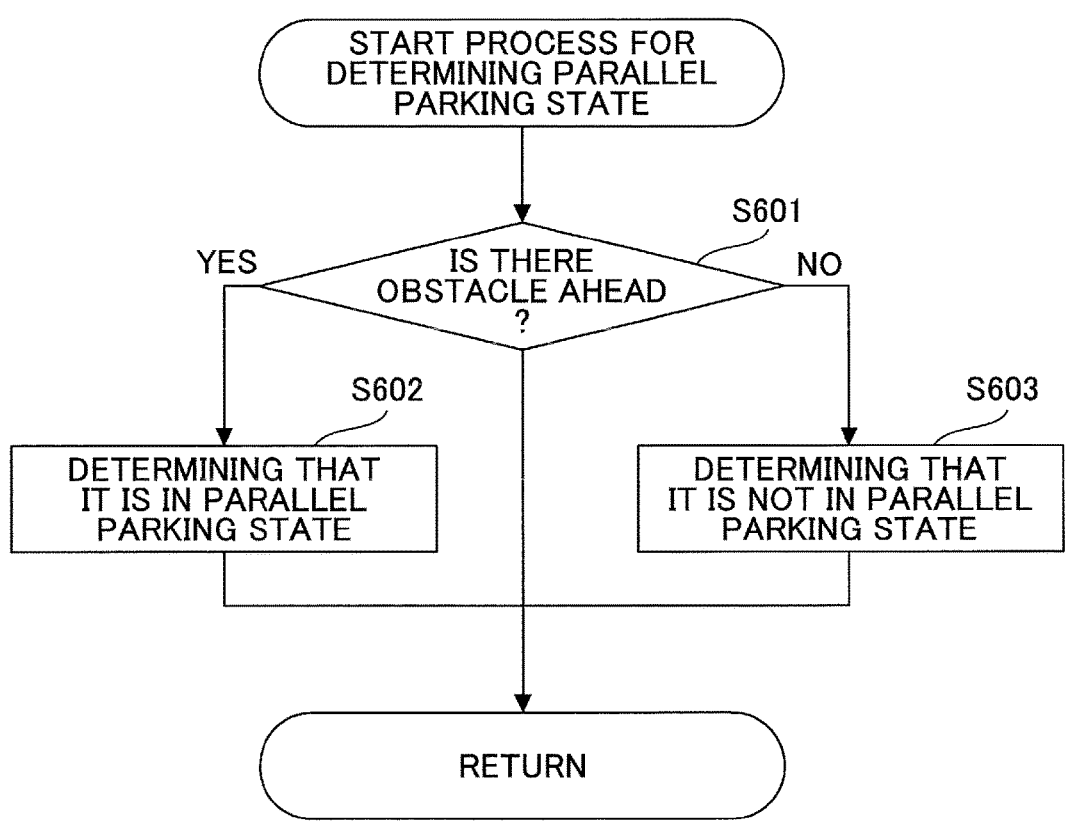
FIG. 6 is a flowchart that illustrates a flow of a process for determining a parallel parking state by a parallel parking state determination unit.

Next, a flow of a process for determining a parallel parking state by the parallel parking state determination unit 403 will be described. FIG. 6 is a flowchart that illustrates the flow of the process for determining a parallel parking state by the parallel parking state determination unit 403. Note that to simplify the description here, the process for determining a parallel parking state will be described that only uses a determination result indicated by the forward obstacle determination unit 401. However, the process for determining a parallel parking state may be executed by using both a determination result indicated by the forward obstacle determination unit 401, and a determination result indicated by the backward obstacle determination unit 402, or may be executed by using only a determination result indicated by the backward obstacle determination unit 402.

At Step S601, based on a determination result indicated by the forward obstacle determination unit 401, the parallel parking state determination unit 403 determines whether there is an obstacle in front of the vehicle 300. At Step S601, if determining that there is an obstacle, the process goes forward to Step S602.

At Step S602, the parallel parking state determination unit 403 determines that the vehicle 300 is in a parallel parking state now, sends the determination result to the activation operation reception unit 406 along with the distance to the obstacle, and then, goes back to Step S504 in FIG. 5.

On the other hand, at Step S601, if determining that there is no obstacle, the process goes forward to Step S603. At Step S603, the parallel parking state determination unit 403 determines that the vehicle 300 is not in a parallel parking state now, sends the determination result to the activation operation reception unit 406, and then, goes back to Step S504 in FIG. 5.

<7. Flow of process for activation control>

Figure 7:
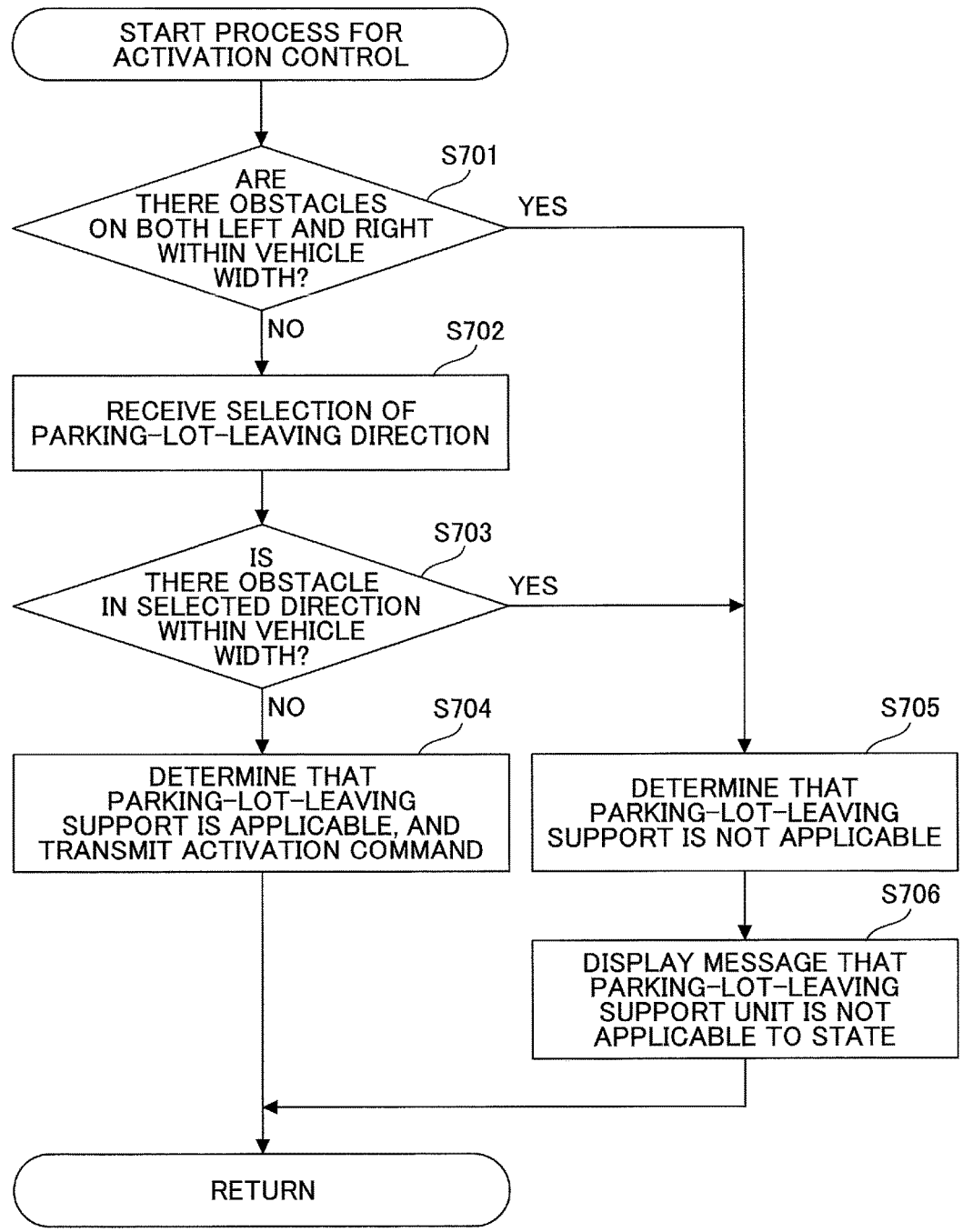
FIG. 7 is a flowchart that illustrates a flow of a process for activation control.

Next, a flow of a process for activation control by the activation operation reception unit 406, the selection operation reception unit 407, and the activation unit 408, will be described. FIG. 7 is a flowchart that illustrates the flow of the process for activation control.

At Step S701, based on existence or non-existence of an obstacle and the distance to the obstacle indicated by the leftward obstacle determination unit 404 and the rightward obstacle determination unit 405, the activation operation reception unit 406 determines whether there are obstacles both on the left and on the right within the predetermined distance. At Step S701, if determining that there are obstacles both on the left and on the right within the predetermined distance, the process goes forward to Step S705.

On the other hand, at Step S701, if determining that there is no obstacle either on the left or on the right within the predetermined distance, or if determining that there is no obstacle both on the left and on the right within the predetermined distance, the process goes forward to Step S702.

At Step S702, the selection operation reception unit 407 displays a preparation screen for the parking-lot-leaving support on the display unit 170 including a message that prompts the driver to perform a selection operation of a parking-lot-leaving direction, and receives blinker information from the co-ECU 150. At Step S703, the selection operation reception unit 407 determines whether there is an obstacle within the predetermined distance in the parking-lot-leaving direction identified based on the blinker information.

At Step S703, if determining that there is an obstacle within the predetermined distance in the identified parking-lot-leaving direction, the process goes forward to Step S705. At Step S705, the selection operation reception unit 407 determines that the parking-lot-leaving support unit 122 is not applicable. Furthermore, at Step S706, the selection operation reception unit 407 displays a preparation screen for the parking-lot-leaving support on the display unit 170, including a message that the parking-lot-leaving support unit 122 is not applicable to the current state of the vehicle.

On the other hand, at Step S703, if determining that there is no obstacle within the predetermined distance in the identified parking-lot-leaving direction, the process goes forward to Step S704. At Step S704, the selection operation reception unit 407 determines that the parking-lot-leaving support unit 122 is applicable, and sends an activation command to the activation unit 408 along with distance to the obstacle ahead or behind. In response to receiving the activation command of the parking-lot-leaving support unit 122 from the selection operation reception unit 407, the activation unit 408 transmits the activation command to the parking-lot-leaving support unit 122 along with the distance to the obstacle ahead or behind. Thus, the parking-lot-leaving support unit 122 is activated to execute the parking-lot-leaving support process.

<8. Transition of screens on display unit>

Next, transition of screens displayed on the display unit 170 will be described. FIG. 8 is a diagram that illustrates the transition of screens on the display unit 170.

In a state where a preparation screen for parking-lot-leaving support 810 is displayed on the display unit 170 by the activation operation reception unit 406 of the activation control unit 121, if an activation button 811 is pressed, the activation operation reception unit 406 determines that an activation operation has been performed.

If the vehicle 300 is in a parallel parking state when the activation button 811 is pressed, the selection operation reception unit 407 displays a preparation screen for parking-lot-leaving support 820 on the display unit 170. On the preparation screen for parking-lot-leaving support 820, a message is displayed to prompt the driver to select a parking-lot-leaving direction.

This makes the driver perform a blinker operation. If there is no obstacle within the predetermined distance in the parking-lot-leaving direction identified by the blinker operation performed by the driver, the parking-lot-leaving support unit 122 is activated, and a screen for the parking-lot-leaving support 830_1 is displayed on the display unit 170.

After the parking-lot-leaving support unit 122 is activated, screens for the parking-lot-leaving support 830_1 to 830_*n* are displayed on the display unit 170 by the parking-lot-leaving support unit 122, and the driver follows displayed contents, to perform parking-lot-leaving operations. Consequently, the vehicle 300 completes leaving the parking lot in the parallel parking, the screen transitions to a screen for the parking-lot-leaving support 830*n*, and then, transitions back to the preparation screen for parking-lot-leaving support 810.

On the other hand, if the vehicle 300 is not in a parallel parking state when the activation button 811 is pressed, the activation operation reception unit 406 displays a preparation screen for parking-lot-leaving support 840 on the display unit 170. On the preparation screen for parking-lot-leaving support 840, a message that the parking-lot-leaving support unit 122 is not applicable is displayed.

Similarly, in a state where the preparation screen for parking-lot-leaving support 820 is displayed on the display unit 170, if there is an obstacle within the predetermined distance in the parking-lot-leaving direction identified based on the blinker operation performed by the driver, the selection operation reception unit 407 displays the preparation screen for parking-lot-leaving support 840.

If the preparation screen for parking-lot-leaving support 840 is displayed on the display unit 170, the screen transitions back to the preparation screen for parking-lot-leaving support 810 after a predetermined time has passed.

<9. Examples>

Figure 9A:
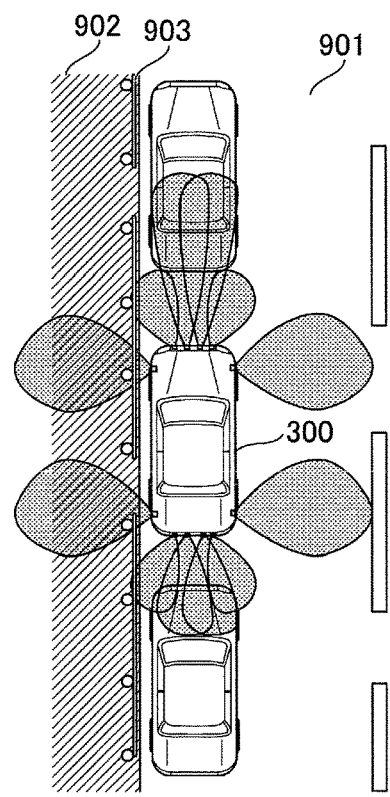
FIGS. 9A-9B are diagrams that illustrate states of parallel parking in which there is an obstacle on the left or on the right.
Figure 9B:
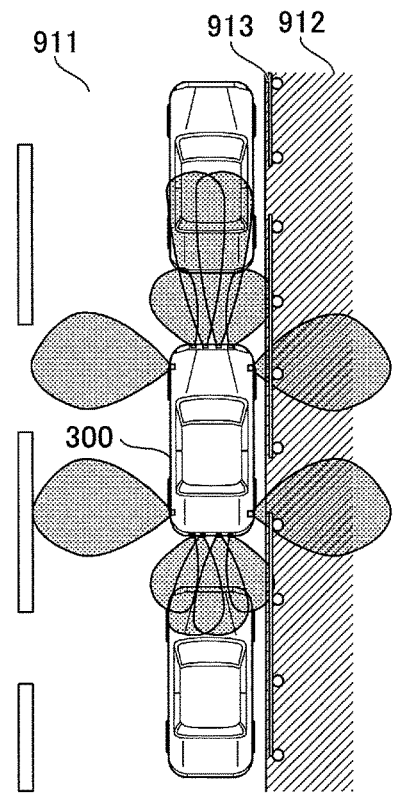

Next, operations of the activation control unit 121 will be specifically described using FIGS. 9A-9B and FIGS. 10A-10C. FIGS. 9A-9B are diagrams that illustrate states of parallel parking in which there is an obstacle either on the left or on the right.

Among these, FIG. 9A illustrates an example in which the vehicle 300 is in a parallel parking state on the shoulder of a left-hand-traffic roadway 901, and the driver activates the parking-lot-leaving support unit 122, to have the vehicle 300 leave a parking lot while receiving the parking-lot-leaving support.

As illustrated in FIG. 9A, if other vehicles are parked in front and rear of the vehicle 300, and the driver performs an activation operation on the preparation screen for parking-lot-leaving support 810, the parallel parking state determination unit 403 determines that the vehicle 300 is in a parallel parking state.

Also, as illustrated in FIG. 9A, there is a sidewalk 902 on the left side of the vehicle 300, and a guardrail 903 is disposed between the roadway 901 and the sidewalk 902. Therefore, the leftward obstacle determination unit 404 determines that there is an obstacle, and sends the determination result to the selection operation reception unit 407.

If the driver performs a blinker operation to the left, the selection operation reception unit 407 determines that the parking-lot-leaving support unit 122 is not applicable. In this case, the preparation screen for parking-lot-leaving support 840 is displayed on the display unit 170, and the parking-lot-leaving support unit 122 is not activated.

On the other hand, if the driver performs a blinker operation to the right, the selection operation reception unit 407 determines that the parking-lot-leaving support unit 122 is applicable. In this case, the parking-lot-leaving support unit 122 is activated, and the screen for the parking-lot-leaving support 830_1 is displayed on the display unit 170. Thereafter, the driver performs parking-lot-leaving operations following the screens for the parking-lot-leaving support 830_1 to 830_*n*, and can have the vehicle 300 leave the parking lot.

FIG. 9B illustrates an example in which the vehicle 300 is in a parallel parking state on the shoulder of a right-hand-traffic roadway 911, and the driver activates the parking-lot-leaving support unit 122, to have the vehicle 300 leave a parking lot while receiving the parking-lot-leaving support.

As illustrated in FIG. 9B, since other vehicles are parked in front and rear of the vehicle 300, if the driver performs an activation operation on the preparation screen for parking-lot-leaving support 810, the parallel parking state determination unit 403 determines that the vehicle 300 is in a parallel parking state.

Also, as illustrated in FIG. 9B, there is a sidewalk 912 on the right side of the vehicle 300, and a guardrail 913 is disposed between the roadway 911 and the sidewalk 912. Therefore, the rightward obstacle determination unit 405 determines that there is an obstacle, and sends the determination result to the selection operation reception unit 407.

If the driver performs a blinker operation to the right, the selection operation reception unit 407 determines that the parking-lot-leaving support unit 122 is not applicable. In this case, the preparation screen for parking-lot-leaving support 840 is displayed on the display unit 170, and the parking-lot-leaving support unit 122 is not activated.

On the other hand, if the driver performs a blinker operation to the left, the selection operation reception unit 407 determines that the parking-lot-leaving support unit 122 is applicable. In this case, the parking-lot-leaving support unit 122 is activated, and the screen for the parking-lot-leaving support 830_1 is displayed on the display unit 170. Thereafter, the driver performs parking-lot-leaving operations following the screens for the parking-lot-leaving support 830_1 to 830*n*, and can have the vehicle 300 leave the parking lot.

Figure 10A:
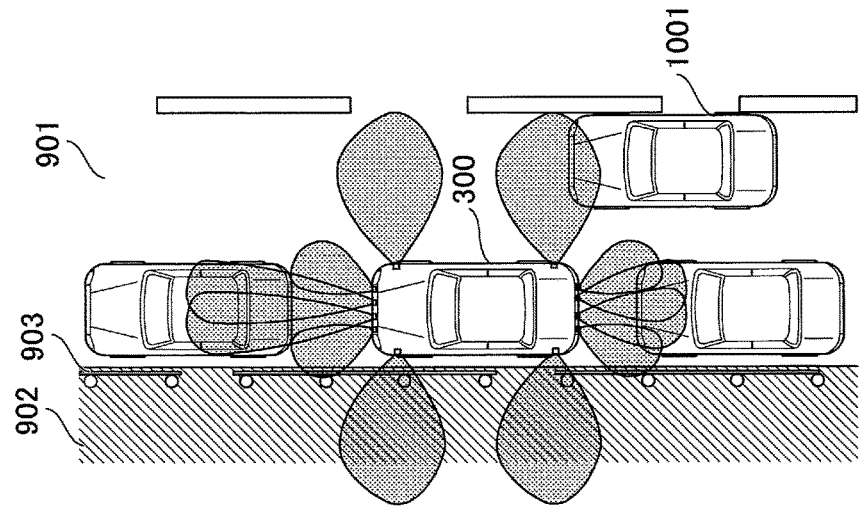
FIGS. 10A-10C are diagrams that illustrate states of parallel parking in which there are obstacles both on the left and on the right.
Figure 10B:
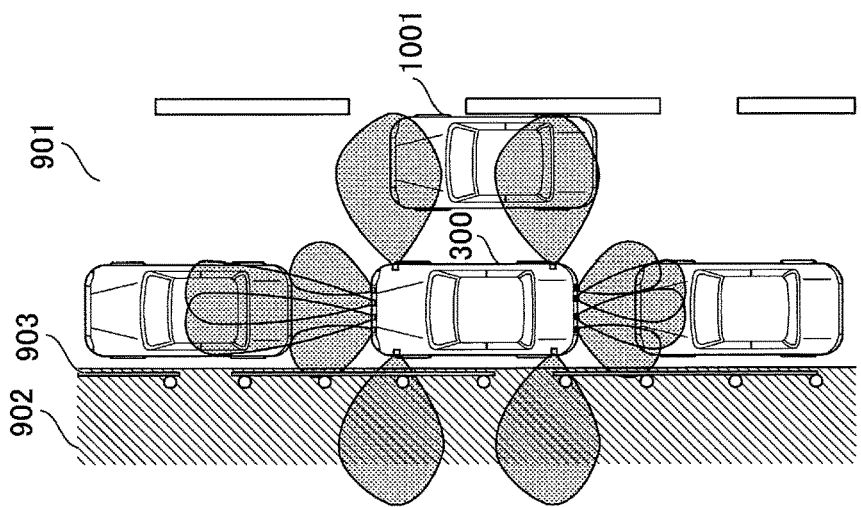
Figure 10C:
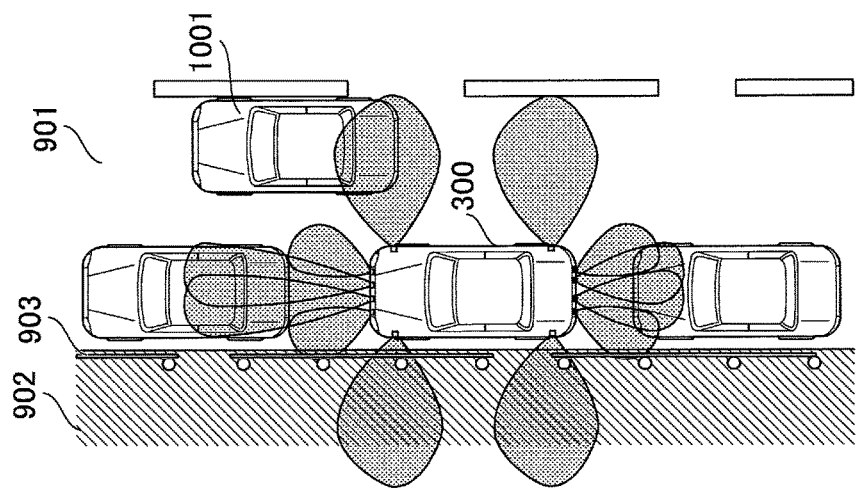

FIGS. 10A-10C are diagrams that illustrate states of parallel parking in which there are obstacles both on the left and on the right. FIGS. 10A-10C illustrate examples in each of which the vehicle 300 is in a parallel parking state on the shoulder of a left-hand-traffic roadway 901, and the driver activates the parking-lot-leaving support unit 122, to have the vehicle 300 leave a parking lot while receiving the parking-lot-leaving support.

As illustrated in FIG. 10A, since other vehicles are parked in front and rear of the vehicle 300, if the driver performs an activation operation on the preparation screen for parking-lot-leaving support 810, the parallel parking state determination unit 403 determines that the vehicle 300 is in a parallel parking state.

Also, as illustrated in FIG. 10A, there is a sidewalk 902 on the left side of the vehicle 300, and a guardrail 903 is disposed between the roadway 901 and the sidewalk 902. Therefore, the leftward obstacle determination unit 404 determines that there is an obstacle, and indicates the determination result to the selection operation reception unit 407. Further, another vehicle 1001 is traveling behind the vehicle 300 on the right. Therefore, the rightward obstacle determination unit 405 determines that there is an obstacle, and indicates the determination result to the activation operation reception unit 406.

Then, the activation operation reception unit 406 determines that there are obstacles both on the left and on the right within the predetermined distance, and determines that the parking-lot-leaving support unit 122 is not applicable. In this case, the preparation screen for parking-lot-leaving support 840 is displayed on the display unit 170, and the parking-lot-leaving support unit 122 is not activated.

FIG. 10B or 10C illustrates an example in which another vehicle 1001 is traveling on the right, or behind on the right of the vehicle 300 when the driver performs an activation operation. Among these, FIG. 10B illustrates a case where it is determined that there is an obstacle within the predetermined distance on the right, based on the rightward received signals transmitted by the rightward sensor (forward) 133 and the rightward sensor (backward) 134. Also, FIG. 10C illustrates a case where it is determined that there is an obstacle within the predetermined distance on the right, based on the rightward received signal transmitted by the rightward sensor (forward) 133. In both cases of FIGS. 10B and 10C, the activation operation reception unit 406 determines that the parking-lot-leaving support unit 122 is not applicable. Consequently, the preparation screen for parking-lot-leaving support 840 is displayed on the display unit 170, and the parking-lot-leaving support unit 122 is not activated.

<10. Summary>

As clarified by the above description, the parking-lot-leaving support ECU 120 in the embodiment is configured not to activate the parking-lot-leaving support function if determining that the state is not suitable for activating the parking-lot-leaving support function, even if the driver has performed an activation operation of the parking-lot-leaving support function of the vehicle in a parallel parking state;

to determine that the state is not suitable for activating the parking-lot-leaving support function if there are obstacles within the predetermined distance both on the left and on the right; and to determine that the state is not suitable for activating the parking-lot-leaving support function if there is an obstacle within the predetermined distance either on the left or on the right, and the driver has selected the side where the obstacle exists, as the parking-lot-leaving direction.

Thus, according to the first embodiment, it is possible to activate the parking-lot-leaving support function of the vehicle in a parallel parking state, depending on a circumstance around the vehicle, and to reduce a sense of discomfort of the driver.

[Second Embodiment]

In the first embodiment, the processes have been described in a case where the vehicle is in a parallel parking state, and the driver performs an activation operation to activate the parking-lot-leaving support function. However, even if the vehicle is not in a parallel parking state, the driver may erroneously perform an activation operation to activate the parking-lot-leaving support function. In this case, if the activation control unit 121 erroneously determines that the vehicle is in a parallel parking state due to an obstacle ahead or behind of the vehicle, then, the parking-lot-leaving support unit 122 is activated, and the driver may feel a sense of discomfort.

Thereupon, in a second embodiment, the parking-lot-leaving support unit 122 is controlled not to be activated even if the activation control unit 121 erroneously determines that the vehicle is in a parallel parking state, and the driver erroneously performs an activation operation of the parking-lot-leaving support unit 122, so as to reduce a sense of discomfort of the driver. In the following, the second embodiment will be described mainly on different points from the first embodiment.

<1. Flow of process for activation control>

Figure 11:
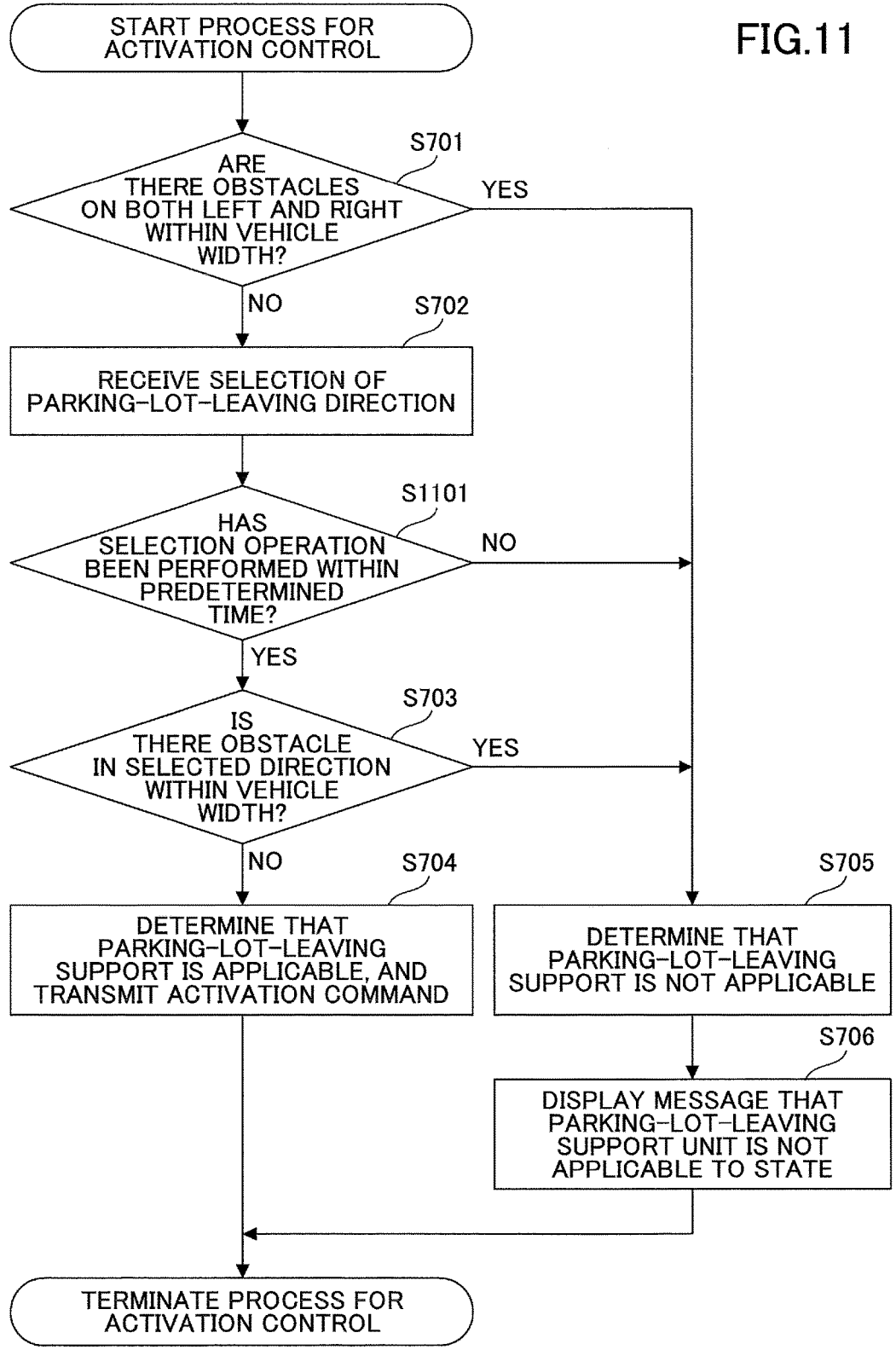
FIG. 11 is a flowchart that illustrates a flow of a process for activation control according to a second embodiment.

First, a flow of a process for activation control will be described according to the second embodiment. FIG. 11 is a flowchart that illustrates the flow of the process for activation control according to the second embodiment. Note that Step S1101 is the difference from the process for activation control according to the first embodiment illustrated in FIG. 7.

At Step S1101, the selection operation reception unit 407 displays a preparation screen for parking-lot-leaving support 820 on the display unit 170 including a message that prompts the driver to perform a selection operation of a parking-lot-leaving direction, and then, determines whether the driver has performed a selection operation within a predetermined time. At Step S1101, if determining that the driver has performed a selection operation within the predetermined time, the process goes forward to Step S703.

On the other hand, at Step S1101, if determining that the driver has not performed a selection operation within the predetermined time, the selection operation reception unit 407 determines that the driver has erroneously performed the activation operation of the parking-lot-leaving support unit 122, and the process goes forward to Step S705. In this case, the selection operation reception unit 407 determines that the parking-lot-leaving support unit 122 is not applicable.

In this way, in the embodiment, the selection operation reception unit 407 determines that the driver has erroneously performed the activation operation of the parking-lot-leaving support unit 122 if the selection operation reception unit 407 has displayed a preparation screen for parking-lot-leaving support 820 on the display unit 170 including a message that prompts the driver to perform a selection operation of a parking-lot-leaving direction, and the driver has not performed a selection operation within the predetermined time. Thus, the parking-lot-leaving support unit 122 is not activated, and a sense of discomfort of the driver can be reduced.

<2. Examples>

Next, operations of the activation control unit 121 in the embodiment will be specifically described using FIGS. 12A-12F. FIGS. 12A-12F are diagrams that illustrate examples of states in each of which a vehicle is erroneously determined to be in a parallel parking state.

Figure 12A:
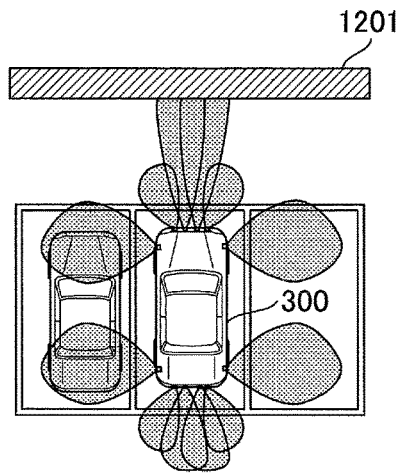
FIGS. 12A-12F are diagrams that illustrate examples of states in which a vehicle is erroneously determined to be in a parallel parking state.
Figure 12B:
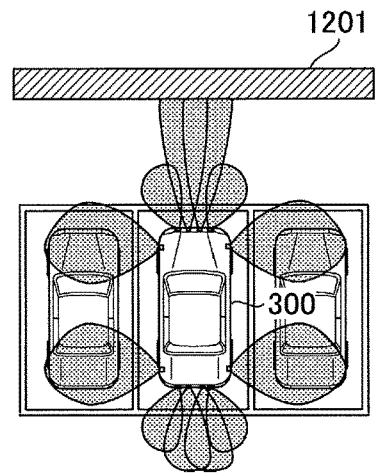

Among these, FIG. 12A or 12B illustrates a case in which the vehicle 300 is erroneously determined to be in a parallel parking state due to a wall 1201 in front of the vehicle 300 parked at a parking lot. As illustrated in FIG. 12A, when the wall 1201 exists in front of the vehicle 300 parked at the parking lot, if the driver performs an activation operation of the parking-lot-leaving support unit 122, the vehicle 300 is determined to be in a parallel parking state due to the obstacle in front. In the example in FIG. 12A, since there is no obstacle within the predetermined distance on the right of the vehicle 300, a preparation screen for parking-lot-leaving support 820 is displayed on the display unit 170.

Note that in a parking state as illustrated in FIG. 12A, the driver does not usually perform a blinker operation to have the vehicle 300 leave the parking lot. Therefore, the predetermined time passes without a parking-lot-leaving direction being specified, and the selection operation reception unit 407 determines that the parking-lot-leaving support unit 122 is not applicable. Consequently, the parking-lot-leaving support unit 122 is not activated even if an activation operation of the parking-lot-leaving support unit 122 has been erroneously performed in a parking state as illustrated in FIG. 12A.

On the other hand, in the example in FIG. 12B, since there are obstacles within the predetermined distance both on the left and on the right of the vehicle 300, the activation operation reception unit 406 determines that the parking-lot-leaving support unit 122 is not applicable. Consequently, even if an activation operation of the parking-lot-leaving support unit 122 has been erroneously performed in a state as illustrated in FIG. 12B, the parking-lot-leaving support unit 122 is not activated.

Figure 12C:
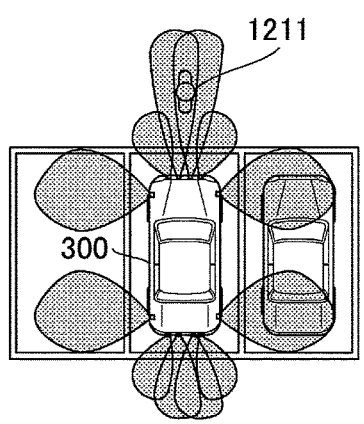
Figure 12D:
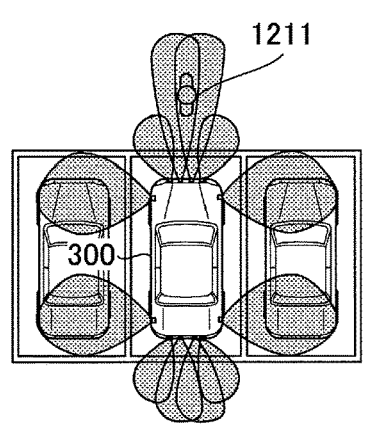

FIG. 12C or 12D illustrates a case in which the vehicle 300 is erroneously determined to be in a parallel parking state due to a pedestrian 1211 passing in front of the vehicle 300 parked at a parking lot. As illustrated in FIG. 12C, if the driver performs an activation operation of the parking-lot-leaving support unit 122 when the pedestrian 1211 passes in front of the vehicle 300 parked at a parking lot, the vehicle 300 is determined to be in a parallel parking state due to the obstacle in front.

In the example in FIG. 12C, since there is no obstacle within the predetermined distance on the left of the vehicle 300, a preparation screen for parking-lot-leaving support 820 is displayed on the display unit 170.

Note that, similar to FIG. 12A, in a parking state as illustrated in FIG. 12C, the driver does not usually perform a blinker operation to have the vehicle 300 leave the parking lot. Therefore, the predetermined time passes without a parking-lot-leaving direction being specified, and the selection operation reception unit 407 determines that the parking-lot-leaving support unit 122 is not applicable. Consequently, the parking-lot-leaving support unit 122 is not activated even if an activation operation of the parking-lot-leaving support unit 122 has been erroneously performed in a parking state as illustrated in FIG. 12A.

On the other hand, in the example in FIG. 12D, since there are obstacles within the predetermined distance both on the left and on the right of the vehicle 300, the activation operation reception unit 406 determines that the parking-lot-leaving support unit 122 is not applicable. Consequently, even if an activation operation of the parking-lot-leaving support unit 122 has been erroneously performed in a state as illustrated in FIG. 12D, the parking-lot-leaving support unit 122 is not activated.

Figure 12E:
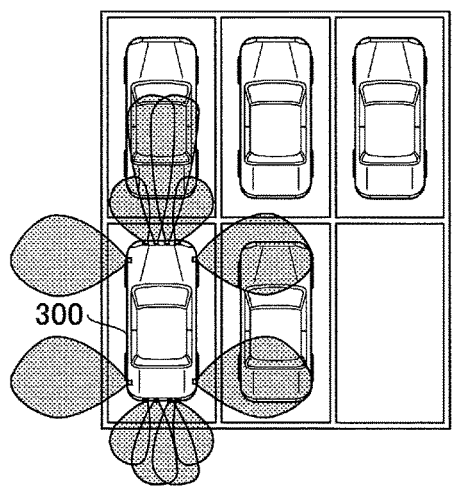
Figure 12F:
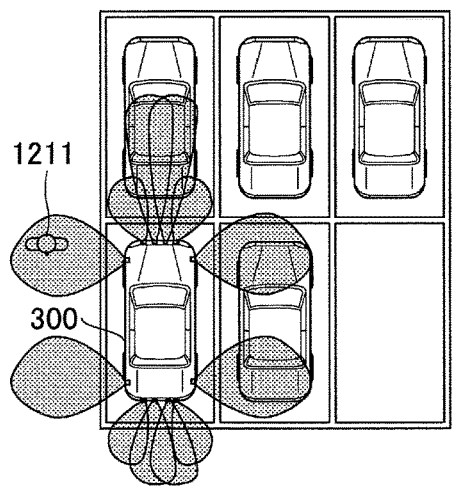

FIG. 12E or 12F illustrates a case in which the vehicle 300 is erroneously determined to be in a parallel parking state due to another vehicle being parked in front of the vehicle 300 parked at a parking lot. As illustrated in FIG. 12E, if the driver performs an activation operation of the parking-lot-leaving support unit 122 when the other vehicle is parked in front of the vehicle 300 parked at the parking lot, the vehicle 300 is determined to be in a parallel parking state due to the obstacle in front.

In the example in FIG. 12E, since there is no obstacle within the predetermined distance on the left of the vehicle 300, a preparation screen for parking-lot-leaving support 820 is displayed on the display unit 170.

Note that, similar to FIGS. 12A and 12C, in a parking state as illustrated in FIG. 12E, the driver does not usually perform a blinker operation to have the vehicle 300 leave the parking lot. Therefore, the predetermined time passes without a parking-lot-leaving direction being specified, and the selection operation reception unit 407 determines that the parking-lot-leaving support unit 122 is not applicable. Consequently, the parking-lot-leaving support unit 122 is not activated even if an activation operation of the parking-lot-leaving support unit 122 has been erroneously performed in a parking state as illustrated in FIG. 12E.

On the other hand, in the example in FIG. 12F, it is determined that there is an obstacle within the predetermined distance on the right of the vehicle 300. Furthermore, since a pedestrian 1211 passes on the left of the vehicle 300, it is determined that there is an obstacle within the predetermined distance. Consequently, the activation operation reception unit 406 determines that there are obstacles within the predetermined distance both on the left and on the right of the vehicle 300, and determines that the parking-lot-leaving support unit 122 is not applicable.

Therefore, even if an activation operation of the parking-lot-leaving support unit 122 has been erroneously performed in a state as illustrated in FIG. 12F, the parking-lot-leaving support unit 122 is not activated.

<3. Summary>

As clarified by the above description, the parking-lot-leaving support ECU 120 in the embodiment is configured to determine that the driver has erroneously performed an activation operation even if the vehicle 300 is erroneously determined to be in a parallel parking state, and a message is displayed to prompt the driver to select a parking-lot-leaving direction in response to the activation operation, but the driver does not perform a selection operation within the predetermined time.

Thus, according to the second embodiment, the parking-lot-leaving support unit is not activated due to an erroneous operation by the driver, and a sense of discomfort of the driver can be reduced.

Note that the present invention is not limited to the apparatuses described in the embodiments and those combined with the other elements. These can be changed within the scope of the present invention, and can be appropriately defined depending on usage.

The present application is based on and claims the benefit of priority of Japanese Priority Application No. 2015-102205, filed on May 19, 2015, the entire contents of which are hereby incorporated by reference.

The invention claimed is:

1. A parking-lot-leaving support apparatus, to execute a parking-lot-leaving support to support a vehicle leaving a parking lot, based on a positional relationship between the vehicle and an obstacle in a back-and-forth direction of the vehicle, wherein the parking-lot-leaving support derives a parking-lot-leaving path to have the vehicle leave the parking lot without contacting the obstacle, the parking-lot-leaving support apparatus comprising:

an ECU configured to determine whether an obstacle is in front of the vehicle, based on a detection result of a detection unit that detects an obstacle in the forward direction of the vehicle, or behind the vehicle, based on a detection result of the detection unit that detects an obstacle in the rearward direction of the vehicle, determine that the vehicle is in a first parking state whenever the ECU determines that an obstacle is in front of the vehicle or behind the vehicle:

inhibit the parking-lot-leaving support when the ECU determines that the vehicle is not in the first parking state;

when the ECU determines that the vehicle is in the first parking state, determine whether an obstacle exists in a left side direction and a right side direction of the vehicle, based on a detection result of the detection unit that detects an obstacle in both side directions of the vehicle;

inhibit the parking-lot-leaving support when the ECU determines that the vehicle is in the first parking state and that an obstacle exists in the left side direction and the right side direction of the vehicle;

when the ECU determines that no obstacle exists in at least one of the left side direction and the right side direction of the vehicle, prompt a driver to select a parking-lot-leaving direction, the parking-lot-leaving direction being the left side direction or the right side direction of the vehicle;

receive a selection operation of the parking-lot-leaving direction from the driver of the vehicle;

after receiving the selection operation, determine whether an obstacle exists in the selected parking-lot-leaving direction;

inhibit the parking-lot-leaving support when the ECU determines that an obstacle exists in the selected parking-lot-leaving direction; and activate the parking-lot-leaving support when the ECU determines that no obstacle exists in the selected parking-lot-leaving direction.

2. The parking-lot-leaving support apparatus as claimed in claim 1, wherein the ECU is further configured to, when the ECU has determined that an obstacle exists in one of a leftward direction and a rightward direction of the vehicle, inhibit the parking-lot-leaving support, based on a relative positional relationship between the obstacle and a parking-lot-leaving direction of the vehicle selected by an occupant of the vehicle.

3. The parking-lot-leaving support apparatus as claimed in claim 1, wherein the ECU is further configured to determine whether a distance between the vehicle and the obstacle detected in the left or right side direction of the vehicle is within a predetermined distance, for determining whether the obstacle exists in the left or right side direction of the vehicle.

4. A vehicle, comprising:
a first detection unit configured to detect an obstacle in a back-and-forth direction of the vehicle;
a second detection unit configured to detect an obstacle in a side direction of the vehicle; and
an ECU configured to execute a parking-lot-leaving support to support the vehicle leaving a parking lot, based on a positional relationship between the vehicle and the obstacle in the back-and-forth direction detected by the first detection unit, the parking-lot-leaving support deriving a parking-lot-leaving path to have the vehicle leave the parking lot without contacting the obstacle in the back-and-forth direction of the vehicle,
wherein the ECU is further configured to:
determine whether an obstacle is in front of the vehicle, based on a detection result of a detection unit that detects an obstacle in the forward direction of the vehicle, or behind the vehicle, based on a detection result of the detection unit that detects an obstacle in the rearward direction of the vehicle,
determine that the vehicle is in a first parking state whenever the ECU determines that an obstacle is in front of the vehicle or behind the vehicle;
inhibit the parking-lot-leaving support when the ECU determines that the vehicle is not in the first parking state;
when the ECU determines that the vehicle is in the first parking state, determine whether an obstacle exists in a left side direction and a right side direction of the vehicle, based on a detection result of the detection unit that detects an obstacle in both side directions of the vehicle;
inhibit the parking-lot-leaving support when the ECU determines that the vehicle is in the first parking state and that an obstacle exists in the left side direction and the right side direction of the vehicle;
when the ECU determines that no obstacle exists in at least one of the left side direction and the right side direction of the vehicle, prompt a driver to select a parking-lot-leaving direction, the parking-lot-leaving direction being the left side direction or the right side direction of the vehicle;
receive a selection operation of the parking-lot-leaving direction from the driver of the vehicle;
after receiving the selection operation, determine whether an obstacle exists in the selected parking-lot-leaving direction;
inhibit the parking-lot-leaving support when the ECU determines that an obstacle exists in the selected parking-lot-leaving direction; and
activate the parking-lot-leaving support when the ECU determines that no obstacle exists in the selected parking-lot-leaving direction.

5. A parking-lot-leaving support system, comprising:
a detection unit configured to detect an obstacle in the side direction of the vehicle; and an ECU configured to execute a parking-lot-leaving support to support a vehicle leaving a parking lot, based on a positional relationship between the vehicle and an obstacle in a back-and-forth direction of the vehicle, the parking-lot-leaving support deriving a parking-lot-leaving path to have the vehicle leave the parking lot without contacting the obstacle in the back-and-forth direction of the vehicle, the ECU being further configured to:
determine whether an obstacle is in front of the vehicle, based on a detection result of a detection unit that detects an obstacle in the forward direction of the vehicle, or behind the vehicle, based on a detection result of the detection unit that detects an obstacle in the rearward direction of the vehicle,
determine that the vehicle is in a first parking state whenever the ECU determines that an obstacle is in front of the vehicle or behind the vehicle;
inhibit the parking-lot-leaving support when the ECU determines that the vehicle is not in the first parking state;
when the ECU determines that the vehicle is in the first parking state, determine whether an obstacle exists in a left side direction and a right side direction of the vehicle, based on a detection result of the detection unit that detects an obstacle in the side direction of the vehicle;
inhibit the parking-lot-leaving support when the ECU determines that the vehicle is in a parallel parking state and that an obstacle exists in the left side direction and the right side direction of the vehicle;
when the ECU determines that no obstacle exists in at least one of the left side direction and the right side direction of the vehicle, prompt a driver to select a parking-lot-leaving direction, the parking-lot-leaving direction being the left side direction or the right side direction of the vehicle;
receive a selection operation of the parking-lot-leaving direction from the driver of the vehicle;
after receiving the selection operation, determine whether an obstacle exists in the selected parking-lot-leaving direction;
inhibit the parking-lot-leaving support leaving when the ECU determines that an obstacle exists in the selected parking-lot-leaving direction; and
activate the parking-lot-leaving support when the ECU determines that no obstacle exists in the selected parking-lot-leaving direction.

* * * * *